Dec. 21, 1943.   L. B. WINTON   2,337,171
LIQUID LEVEL INDICATOR
Filed July 14, 1942   4 Sheets-Sheet 3
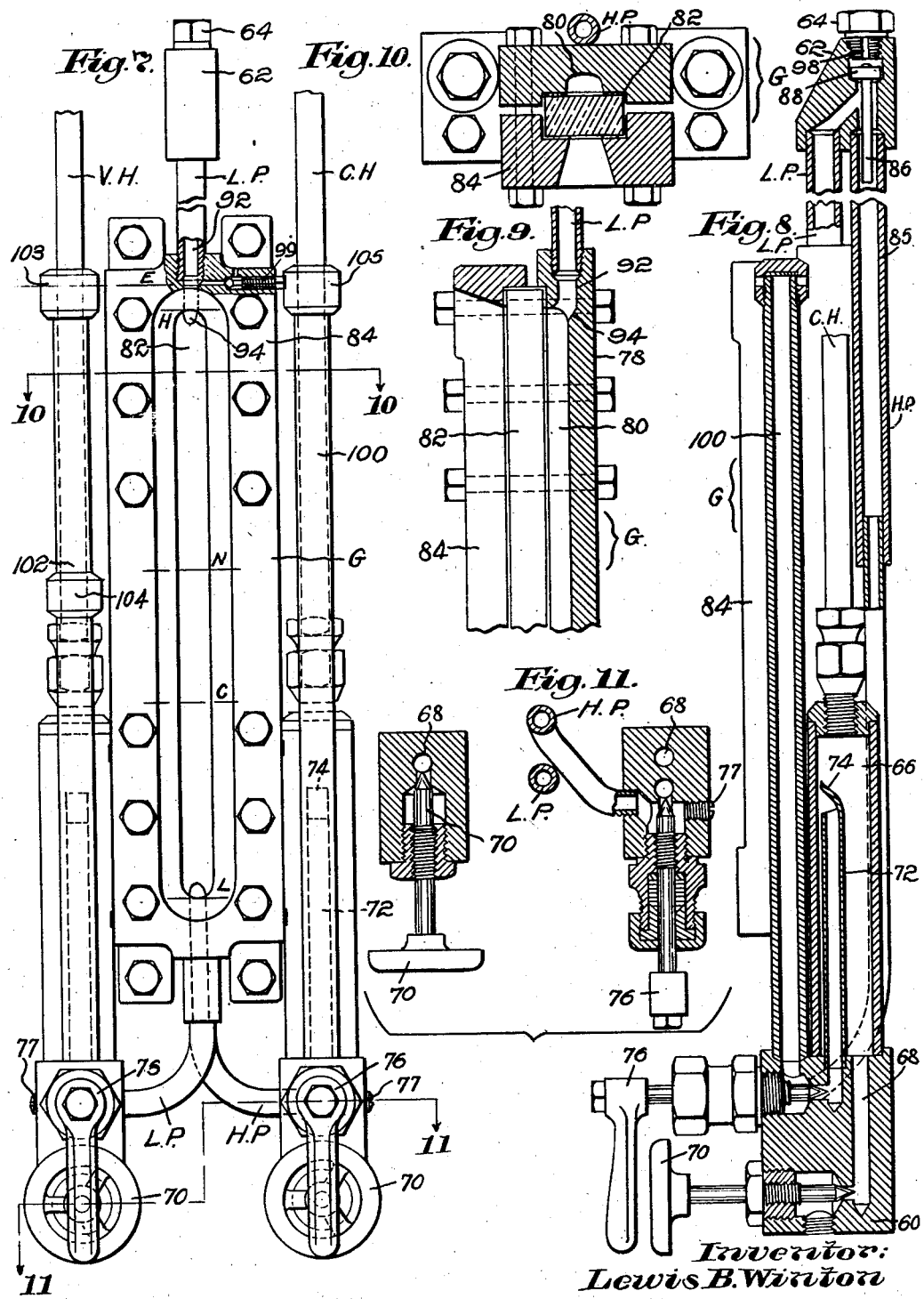
Inventor:
Lewis B. Winton Dec. 21, 1943.    L. B. WINTON    2,337,171
LIQUID LEVEL INDICATOR
Filed July 14, 1942    4 Sheets-Sheet 4
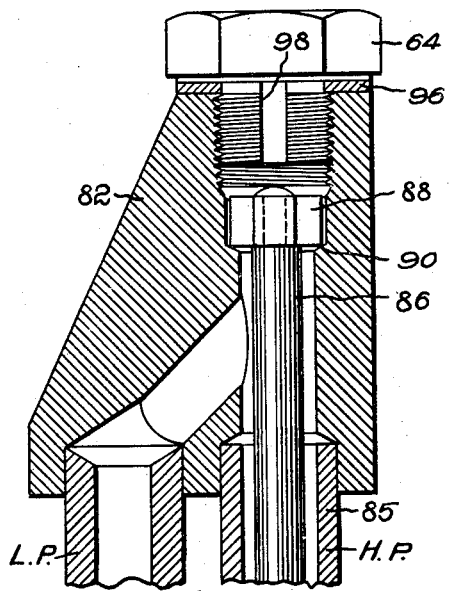
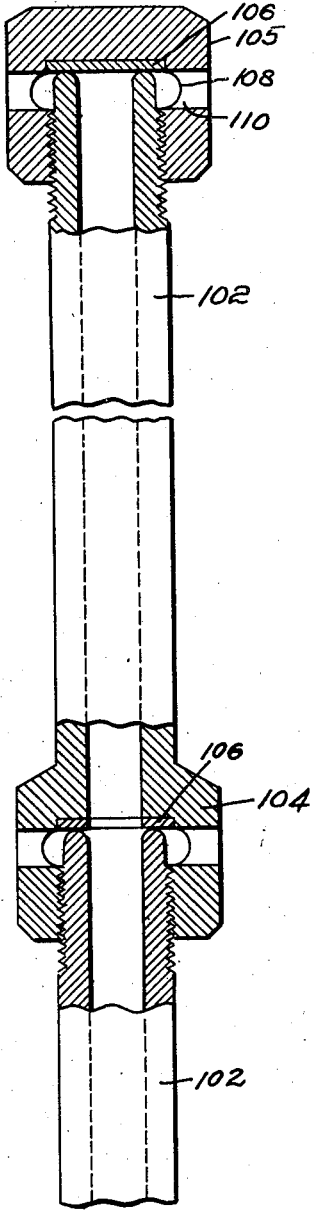
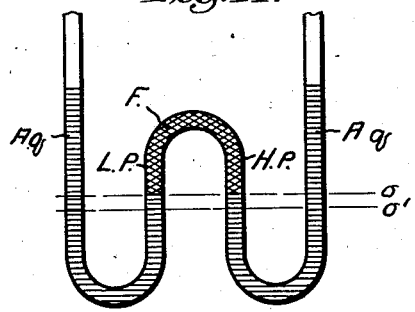
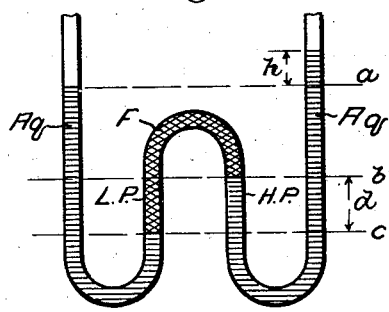
Inventor:
Lewis B. Winton,
by Emery, Booth, Townsend, Miller, Widner
Attys Patented Dec. 21, 1943

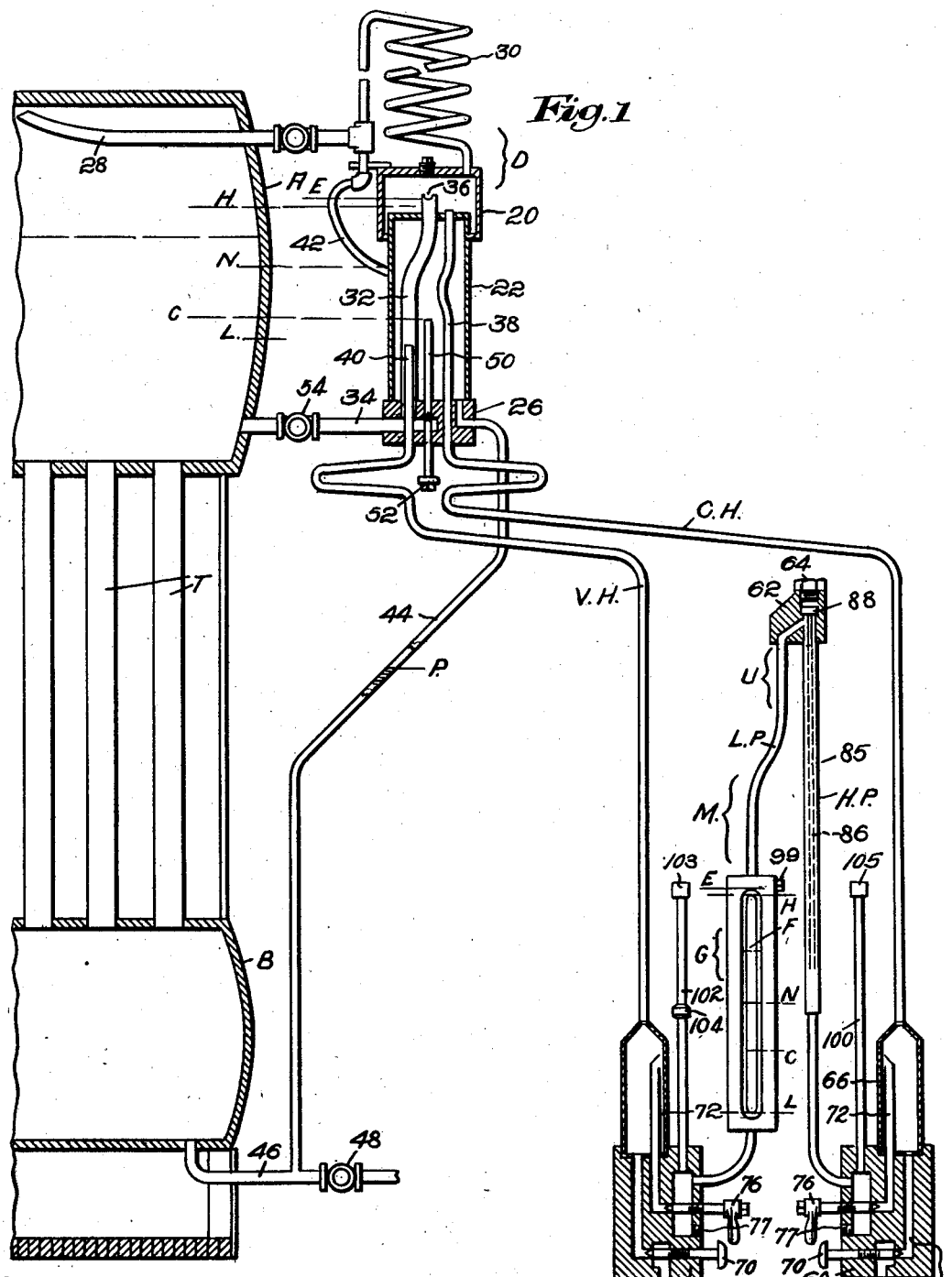

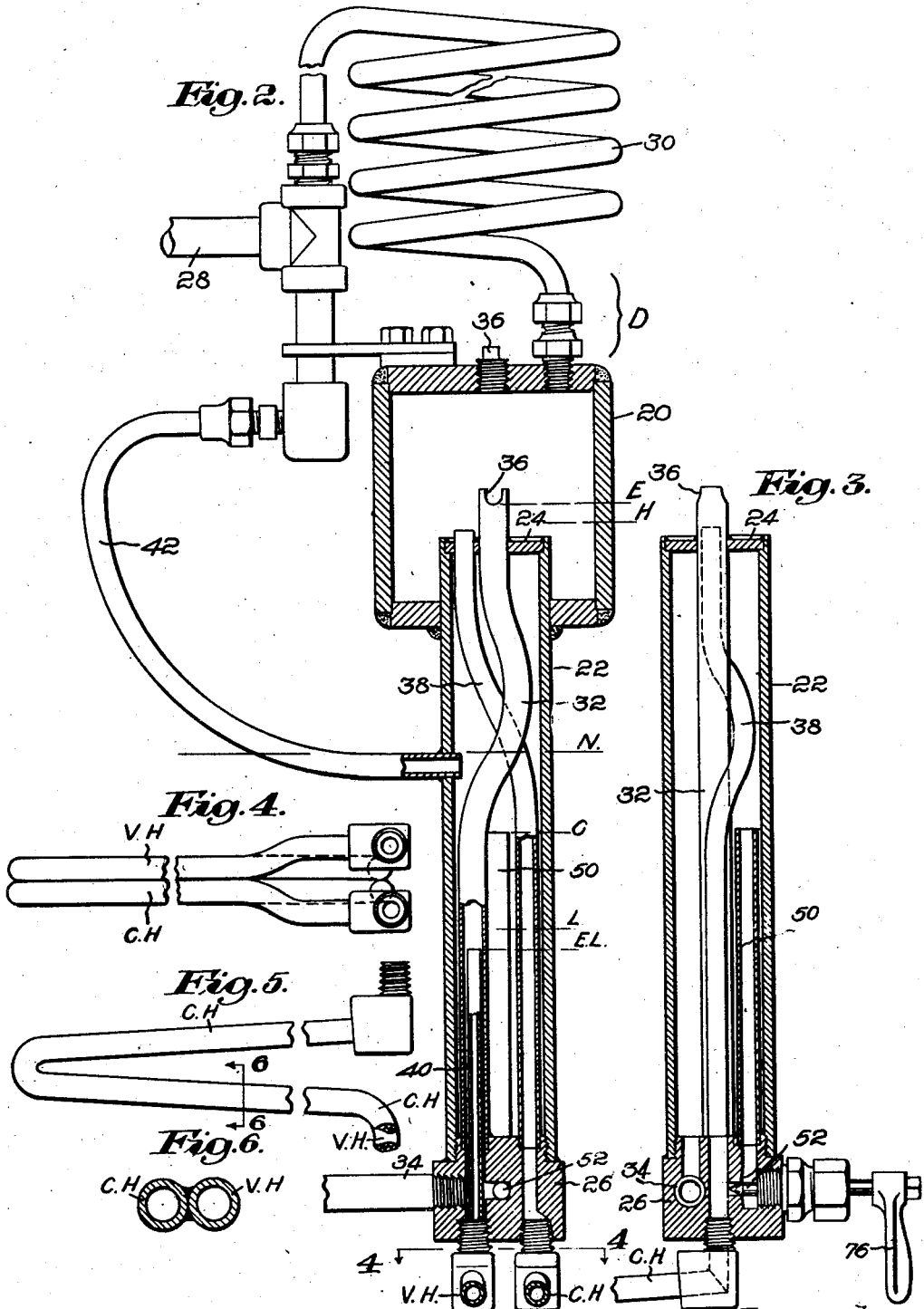

2,337,171

UNITED STATES PATENT OFFICE 2,337,171

LIQUID LEVEL INDICATOR

Lewis B. Winton, Greenwich, Conn., assignor to Philip A. Jerguson, Medford, Mass.

Application July 14, 1942, Serial No. 450,860

24 Claims. (Cl. 73—302)

This invention relates to apparatus for indicating the level of liquid in a container, and in particular a pressure container, such, for example, as a boiler, and the object is to provide an improved construction whereby an accurate indication of the liquid level may be manifested by means of a suitable differential manometer at some point remote from the container.

While the invention is not limited thereto, the specific construction hereinafter to be described is adaptable for use on marine boilers wherein the demands are severe, in part because of conditions arising from the rolling or pitching of the vessel in a seaway. I shall herein describe the device as applied to such a boiler and will refer from time to time to conditions arising in marine practice although it will be understood that the purpose is descriptive and not definitive and that the structure described as well as variants thereof within the scope of the invention is adaptable to other uses.

Briefly to describe the type of device which I show by way of example, I provide means for establishing a normally fixed liquid head preferably somewhat greater than that of a normal "high" water level and subject to the boiler pressure and a variable head corresponding to the actual water level in the boiler, also under the boiler pressure, and transmit these to a remote differential manometer of the liquid-filled U-tube type, although, as indicated by some of the claims hereinafter appended, I consider various parts of the system novel as such and useful in installations otherwise different from that specifically disclosed or as above outlined.

Installations such as that which has just been broadly described have hitherto been proposed but have not been satisfactory in practice and their design appears not to have been based on intelligent analysis of the factors involved. I also believe that their shortcomings have been due in part to the fact that the indications thereof have been intended to be correlated to correspond with those of the ordinary visible gage glass which, notably in the case of marine boilers, give far from correct information as to the conditions inside the boiler. Apart from disadvantages in prior systems arising from mechanical construction, those prior devices with which I am familiar are subject to various errors either entirely unappreciated or ignored as negligible whereas at least the cumulative effect thereof may be substantial.

My invention will be well understood by reference to the following description of the illustrative embodiment thereof shown by way of example in the accompanying drawings, wherein:

Fig. 1 is a schematic diagrammatic view of a boiler with an instrument or combination of instruments exemplary of my invention associated therewith. The parts are not to scale and in general one might refer to the view as a development in a plane, as an attempt has been made to illustrate all the parts in the plane of the paper to permit them to be viewed as a whole.

Fig. 2 is a more realistic view in vertical section of the mechanism which is normally installed adjacent the boiler and provides for establishing the liquid heads, the differential between which corresponds to the liquid level of the boiler;

Fig. 3 is a section of part of the device of Fig. 2 taken in a relatively perpendicular plane;

Fig. 4 is a section on the line 4—4 of Fig. 2;

Fig. 5 is a side elevation of what appears in Fig. 4;

Fig. 6 is a section on the line 6—6 of Fig. 5 on an enlarged scale;

Fig. 7 is a broken elevation of the differential manometer;

Fig. 8 is a view of Fig. 7 as seen from the right-hand side thereof but with various of the parts broken away to appear in section;

Fig. 9 is a fragmentary vertical section through Fig. 7 on a central plane;

Figs. 10 and 11 are sections on the lines 10—10 and 11—11 of Fig. 7, respectively;

Fig. 12 is a vertical section through the fitting at the top of the inverted U-tube which forms a part of the manometer;

Fig. 13 is a detailed view, partly in section, of a portion of the stand-pipe which appears at the left of Fig. 7; and Figs. 14 and 15 are diagrams to be referred to.

Referring to Fig. 1, I have there shown schematically a boiler comprising upper and lower drums A and B connected by the water tubes T. Adjacent the upper drum and communicating with the steam and water spaces thereof is a structure designated as a whole by the reference letter D and which for convenience I shall call a "datum chamber" and which provides for establishing fixed and variable liquid heads, the momentary difference between which indicates the liquid level in the boiler. The upper drum A of the boiler and the chamber D are ordinarily at a substantial elevation far above the head of an observer on the boiler room floor. The liquid heads referred to are transmitted through the pipe connections C. H. and V. H. (expressive of "constant head" and "variable head" respectively) to a differential manometer M located at some convenient location remote from the boiler and which in the present instance is of the inverted U-tube type, one containing a manometric liquid F of a lesser specific gravity than water. One leg of the manometer, the left-hand leg viewing Fig. 1, being that leg in which the surface where the manometric fluid meets the water column sustaining its rises as the variable pressure increases, is transparent to permit the observation of the fluctuations of this surface. This portion G, which for convenience I herein term the gage proper, while of novel construction, may be generally similar to gages of the type having a rigid body closed by a flat glass such as are not uncommonly used on high pressure liquid containers.

While I have herein referred to the manometer as comprising a U-tube, and in fact the part marked "U" is indeed generally similar in form to an inverted letter U, except when the context otherwise indicates, in referreing to a U-tube I shall use that word in a generalized sense to denote communicating chambers which receive a body of manometric fluid serving as a liquid piston subject to opposed pressures which may displace the fluid more or less from one chamber to another.

Merely for convenience in the following description we may suppose that the boiler is operating under 600 pounds pressure and the specific gravity of the water in the upper drum is .787. The dimensional design of the instrument will be determined in part by the operating pressure.

I shall first describe the apparatus D, which I have herein referred to as a datum chamber and a preferred form of which is shown by way of example in the accompanying drawings, particularly in Figs. 1, 2 and 3, Fig. 1 being diagrammatic and Figs. 2 and 3 being more realistic in their disclosure. The apparatus comprises a datum cup 20 which is supported on a cylinder 22 projecting upwardly into the same and forming a steam jacket closed at its upper end by a head 24 and at its lower end by a fitting 26. The cup 20 is in communication with the steam-containing spaces of the boiler and I have therein shown a pipe 28 which opens within the upper drum A at as high a level as conveniently possible so that water may not enter the same on surging of the water within the drum and which conducts steam to the cup through a suitable condenser 30 permitting the cup to fill with condensate to a predetermined level E, which we may refer to as the datum level and which may be a slight distance above the normal high water level in the boiler marked "H" on Fig. 1. This level may be maintained by means of an overflow tube 32 projecting upwardly into the cup and extending through the jacket 22 to the fitting 26, the tube preferably being crumped or curved as it extends through the jacket to permit of expansion and communicating at its lower end through the fitting 26 with the valved connection 34 to the water-containing space of the boiler drum A, the connection 34 and fitting 26 being preferably in the same horizontal plane; that is, the connection 34 has no vertical component to trap and retain a column of water which could become relatively cool and dense. To provide for overflow of the cup to the tube 32 the upper end thereof may be provided with a notch or notches 36 in a single vertical plane which in the case of a marine installation preferably extends fore and aft, this construction tending to prevent undue loss of liquid through the tube as the apparatus is inclined, the fore and aft disposition being due to the fact that the angle at which a ship pitches, which would alter the angle of the surface of the water in the cup with respect to the apparatus, is less than the angle through which it rolls. From the body of liquid in the datum cup a pipe 38 extends through the steam jacket 22 to the fitting 26, this likewise being crumped within the steam jacket.

The fixed head of liquid in the datum cup 20 which is subject to the steam pressure of the boiler is thus transmitted through pipe 38 through the C. H. connection to one side of the manometer, that connection being made to the fitting 26, while the head of water in the overflow tube which, assuming that the column is of the same temperature as that of the water in the boiler so that the specific gravity is the same, corresponds to the height of the liquid in the boiler and is likewise subject to the steam pressure, is transmitted to the other side of the manometer through the connection V. H. which likewise enters the fitting 26. Preferably, however, the connection V. H. has an extension 40 extending upwardly into the tube 32 to a point slightly below normal low water level in the boiler. Thus if the boiler water falls unduly, as, for instance, when the boiler is blown down, the water level in the V. H. connection cannot fall lower than the pressure corresponding to the top of the tube 40 and a greatly unbalanced pressure on the manometer is prevented.

Since the apparatus D is outside of the boiler, it is subject to room temperature lower than boiler temperature and which may considerably vary from time to time. To maintain the temperatures of the water columns in the apparatus and their specific gravity, steam may be admitted through the connection 42 to the jacket 22, thus heating the tubes 32 and 38, and, through the upward extension of this jacket within the cup 20, the body of condensate within the cup. Steam is exhausted from the jacket 22 by a pipe 44 which may extend from the fitting 26 and opens to a relatively low point in the boiler, herein to the pipe 46 leading from the lower drum B just inwardly of the blow-down valve 48. This pipe is subjected to the room temperature so that the exhaust steam condenses therein and cools relatively rapidly and the condensate will stand at a level P (Fig. 1) substantially below the level of the water in the boiler drum A although in communication therewith. This is due to the fact that, assuming a room temperature at 100°, water in the pipe 44 will attain a specific gravity of about .99 and the level P will then be about two feet below the level of the water in the boiler drum A if the pipe 46 is ten feet below that level. Adequate exhaust of the steam from the jacket 22 and continuous circulation therein at a uniform rate is thus provided for.

I also provide within the jacket 22 an open-ended stand-pipe 50, which I term a checking tube, which rises from the fitting 26 and is in communication at its lower end, under control of a valve 52, with the overflow tube 32 and the connection 34 to the water-containing space of the boiler. The top of this tube terminates at a suitable level, preferably and in part for reasons which will more fully appear later, at a point between low water and the normal water level in the boiler, as indicated by the marks L and N on Fig. 2. This arrangement permits checking of the manometer under operating conditions and under the steam pressure existing in the boiler in the following manner.

Let us suppose the valve 54 to the water-containing space of the boiler to be shut and the valve 52 to be open. The water in the tube 32 will overflow through the top of the checking tube 50 and in the V. H. connection to the manometer we will then have a fixed liquid head corresponding to the top end of the checking tube 50 and subject to the steam pressure in the boiler, while in the C. H. connection we have the fixed head established in the datum cup 20, likewise subject to the pressure in the boiler and the differential is fixed. Our manometer should then indicate this differential which may be suitably indicated by a scale mark. If it does, the installation is functioning properly. If it does not, we must determine the source of the error. On shutting valve 52 and opening valve 54 the parts are immediately returned to operating position.

One condition which is thus checked is, in the case of a manometer of the U-tube type, whether the proper quantity of manometric liquid is present and the checking tube 50 is also of great utility in permitting the filling of the manometer and placing the installation in operation in the first instance, as will hereinafter appear.

It will be noted that the connections C. H. and V. H. are subject to room temperature, which, of course, is much less than the boiler temperature. Now, if there is a considerable fluctuation in the boiler level, that is, suppose the level changes from normal to low, cool water is forced from the V. H. connection up into the apparatus D and hot water is drawn downwardly into the C. H. connection and the gravimetric values are disturbed since the density in the C. H. tube becomes less than normal and that in the V. H. tube greater than normal, and experience has shown that under ordinary conditions this disturbance would not correct itself for a long time. I therefore prefer to make the connections C. H. and V. H. immediately adjacent the fitting 26 in the manner more fully illustrated in Figs. 4, 5 and 6, that is, running them substantially horizontally, that is, without change of head for a considerable distance so that changing densities in the tubes being confined to horizontal runs will no longer affect the readings of the manometer. If the tubes were perfectly horizontal, thermal circulation currents would be set up within the tube. In the case of copper tubing the desired effect may be attained, as shown in Figs. 4 and 6, by extending them at a downward pitch of about three-quarters of an inch to the foot for about half the desired distance and then bending them 180° backwardly at a like pitch and then down, as illustrated in Figs. 4 and 5. A total length of about two feet is sufficient. For like purposes an equalization of temperature between the two tubes may be promoted and I have herein in Fig. 6 shown the approximately horizontal branches as in contact one with another and brazed together throughout their opposed surfaces to permit a rapid temperature equalization between the same so that any errors due to variation of temperature are localized. As seen in Figs. 2 and 3, these approximately horizontal runs of the connections desirably extend in the case of a marine installation in a fore and aft direction as in practice they will thus depart less from the horizontal than if they were extended athwartships.

I shall now describe the preferred form of differential manometer herein illustrated and which I have already indicated as being of the inverted U-tube type utilizing a manometric liquid F lighter than water. A suitable preferred liquid will hereinafter be described.

Referring to Fig. 1 for a diagrammatic illustration and to Figs. 7 and 11 for details, the manometer may be organized with a pair of fittings 60, which may be considered the bases of the legs of the inverted U, and a fitting 62 which may be considered the connecting arm of the U and which is provided with a filling and bleeding plug 64 of special construction, and between these fittings the legs of the U, H. P. and L. P., extend, the so-called "gage proper" G being incorporated in the leg L. P. The designations L. P. and H. P. have been chosen to suggest the words "high pressure" and "low pressure" and, of course, correspond respectively to C. H. for "constant head" and V. H. for "variable head," the H. P. leg being in communication with the C. H. piping and the L. P. leg in communication with the V. H. piping, the different marking being here adopted to differentiate between the physical structures shown in the drawings. The connection of the C. H. piping to the H. P. leg, the description of which will apply, mutatis mutandis, to the connection of the V. H. piping to the L. P. leg, may be made as follows (see Figs. 1 and 8). The C. H. pipe may discharge to a dirt trap 66 projecting upwardly from the fitting 60 through which opens a discharge waterway 68 controlled by a blow-off valve 70. Water is taken from the trap through the tube 72 extending upwardly out of line with the entrance of the C. H. pipe, the tube having a portion of its end cut away and the remaining portion 74 bent over as a shield for the bore of the tube to divert any dirt in the water from the tube 72 and toward the bottom of the trap. The tube 72 has a connection controlled by valve 76 (see Fig. 11) to the H. P. leg. A drain plug 77 is also provided at the manometer side of the valve for a purpose which will appear. The connection of the left-hand fitting 60, viewing Fig. 7, to the L. P. leg is similar and indicated by like numerals and it will be unnecessary to repeat the description.

The two upright legs H. P. and L. P. are located as close together as possible and their common plane in the case of a marine installation is preferably fore and aft. Referring to the diagram Fig. 15 showing an inverted U-tube under conditions of unbalanced pressure, it will be clear that if the entire installation is tilted, the surfaces of the manometric fluid F will nevertheless maintain the true horizontal, and if the tilt is to the left or clockwise, viewing the figure, the level in the right-hand leg will rise and in the left-hand leg will fall, and if we are reading our indication from a scale associated with the left-hand leg, the boiler level has apparently been reduced. This effect is observed unless those portions of the U in which the surfaces of the manometric fluid are located during use are concentric or coaxial. Since the construction of a U-tube in this manner introduces certain constructional disadvantages, I have herein shown in the preferred form the legs as spaced but as closely arranged as possible to minimize the error and recommend their installation in the fore and aft plane since the pitch of a ship is of less amplitude than the roll.

Referring now to the so-called gage proper G which is incorporated as a part of the L. P. leg, in order to permit the observation of the point of contact of the manometric fluid with the water column sustaining it to give an indication of the boiler level, this may be formed of a heavy slab or bar 78 of metal, in one face of which and between the ends of which is milled a chamber or slot 80 to which communication is had through the ends of the bar as indicated in the case of the upper end in Fig. 9. The open side of the slot is covered by a flat glass 82 resting against a suitable gasket and retained by the frame 84 bolted to the bar in any suitable manner as common in gage practice. The location of the gage G is such that in normal operation of the boiler the meeting level between the water column and the manometric fluid F fluctuates behind the glass G, preferably under conditions hereinafter described. The bar 78 may be made of stainless steel or the like so that the back of the channel 80 has a bright and reflecting surface. The manometric fluid F may be colored dark blue or the like, and in this case if we observe the gage in the manner shown in Fig. 7, the column of water in the bottom thereof appears as water, being illuminated by reflected light from the back of the channel and observed in the same manner as a column of water is observed in a conventional tubular gage glass and is readily seen even in a rather dim light, whereas the dark liquid above the same effectually obscures the reflecting inner surface of the gage and looks like nothing. A readily observed reading entirely comparable in appearance to the familiar reading of a gage glass is thus provided for, this being one of the advantages arising from the use of a fluid lighter than water.

Referring again to Fig. 15, it will be apparent that in the construction shown the columns of fluid in the several branches or legs of the tubing shown balance each other in the zone between the lines $a$ and $b$ and in the zone below the line $c$ and also that the columns in the two outer branches in the zone between the lines $b$ and $c$ balance each other. The head of liquid $h$ above the line $a$ at the right-hand side, therefore, is balanced by the algebraic sum of the columns of height $d$ present in the two inner branches, and if we represent the specific gravity of water by $l$ and the specific gravity of the manometric fluid F by $g$, we may write $h = d(l-g)$. In the case of a uniform bore as in the diagram, the fluctuation in the L. P. leg corresponding to a given height $h$ will be much greater in linear measure since, from the above, $$\frac{d}{h} = \frac{l}{l-g}$$

Therefore, under these conditions a variation of one inch in the boiler would produce a greater fluctuation at the gage G. It is desirable to have the amount of fluctuation observed in the gage G at least approximately the same as that in the boiler and I provide means for effecting this end. Referring again to the diagram, if the H. P. or right-hand leg of the inner U were of relatively restricted dimension, a relatively large variation in the height of the column therein between the lines $b$ and $c$ would cause a relatively small volumetric transfer of fluid to the left-hand or L. P. leg and the depression of the surface of F in that leg would be correspondingly diminished.

Referring now to Figs. 8 and 12 of the drawings, this restriction of the volumetric capacity or cross section of the H. P. leg is herein effected by forming a portion of that leg immediately below fitting 62 as an enlarged tube 85 and inserting therein a displacement member or calibrating rod 86 of suitable cross section, which may be suspended therein from a cross-bar 88 resting against a shoulder 90 in the fitting 62. The rod may be introduced through the filling plug 64 which is in line with the enlarged tube 85. The net cross-sectional area of the chamber in which the level of fluid F fluctuates on the H. P. side is thus restricted to such a value that the desired movement of the level on the L. P. side is manifested at the gage G.

Assuming that the normal fluctuation in the boiler is ten inches between high and low, the gage proper G may be similar to a so-called ten-inch gage glass, the pane or window defined by the frame 84 being about ten inches in height. Low water, as indicated in the drawings, is at the bottom of the window and I prefer to have the level corresponding to high water at the uppermost end of the window. The indications are thus similar to those of an ordinary gage glass. It will be apparent, referring to Fig. 1, that if the indications of the manometer are taken from some such apparatus as D, the pressures would be equalized if the water rose to the datum level in the cup 20, which is preferably made only slightly above the normal high water level H, say half an inch, and I prefer to have this level obscured in the normal operation of the gage, this being effected in the example shown by having the high level at the uppermost end of the window. The gage could indicate no level higher than this datum or equalizing level, and if the indications were visible at datum level, the operator would not know whether the level was slightly above high or much above high. This concealment of the indication in the neighborhood of high water is advantageous although it introduces certain problems in connection with filling and checking which, however, are solved by the construction described, as will be apparent from the description already given and hereinafter to be amplified.

If the fluctuation of the gage is to be uniform throughout its range, the bore of the portions through which the surfaces of the manometric fluid move should be uniform. This is attained in the H. P. leg by the provision of the enlarged pipe 85 of suitable length and the calibrating rod 86. We wish the level as it passes beyond "high" to disappear entirely from the channel 80 of a gage construction such as has been described. It will be clear that this slot 80 itself due to its curved form at its upper end varies in cross section. To permit the effective cross section of the passageway through the upper end of the gage to the L. P. pipe to be made to a point above the window defined by the frame the same as the cross section of the opening of the gage proper as defined by the channel 80 and the glass 82 overlying the same, the following construction may be adopted. A cylindrical opening 92 in the outer end of which the L. P. pipe is secured may be made of the same cross-sectional area as the body of the channel 80 and with its axis coincident with the base of the channel and its inner end coinciding with the end thereof. A suitable "conical" boring tool may then be inserted in the opening to complete a passage at 94, the base of the cone being at the end of the channel and being of a diameter equal to that of the cylinder 92 and its apex located at the point where the cross-sectional area of the gage channel changes. The shape of the side is calculated to agree with the shape of the channel to maintain the constant cross-sectional area desired. Sufficiently accurate results may be attained by using a true cone having straight sides. The construction at the lower end of the gage may be the same.

I shall next describe the manner in which the manometer may be placed in service and checked from time to time for accuracy. We will assume that the boiler and the apparatus D are in operating condition, as indicated in the drawings and diagram, and at proper temperature but that the manometer is shut off therefrom by the valves 76 and is empty. The filling plug 64 at the top of the U is removed and water is admitted through the valves 76 until the manometer is full and overflows at the top. Drain plugs 77 are then opened and a volume of water is withdrawn in excess of the volume of the manometric liquid required, which in the case of the L. P. leg would ordinarily mean that the level of water would appear at the gage glass G. The manometer is then filled full with the manometric liquid F through the plug 64 until it overflows at the top. In this connection, referring to Fig. 12, it may be noted that this plug 64 is of a particular design such that screwing it tight will not tend to compress any liquid in the system. The sealing is effected by a washer 96 of brass or non-corroding ferrous metal interposed between the flat top of the fitting 62 and the head of the plug, while the threaded shank of the plug has a flat end and an axial channel 98 extending from the end to the bottom of the head in such manner that liquid is discharged until the very moment when effective sealing is effected and screwing down the plug does not tend to displace any liquid downwardly.

The valve 54 (Figs. 1 and 2) is now closed and the valve 52 opened and the shut-offs 76 opened. We now have impressed on the H. P. side of the manometer the constant head represented by the level of water in the datum cup 22 and on the L. P. side a fixed known head corresponding to the top end of the checking tube 50. The proper point for indication of this level is indicated on the gage G by a suitable scale mark at C. Since, however, an excess of liquid F was added, the reading normally will be below this level. The plug 64 or a special bleeder valve 99 at the top of the gage G is then cracked and the excess manometric fluid allowed to bleed out until the indication is at the point C, the manometer thus being adjusted to a known differential between two fixed heads. The plug 64 or valve 99 is then closed, valve 52 is shut and valve 54 opened, and the apparatus is ready for operation.

At any time during operation, by closing valve 54 and opening valve 52, fixed differential heads will be impressed upon the manometer, and if the gage reads at the checking point C, everything is in order. Reverse the procedure and the apparatus is again in service. It will be noted that this adjustment of the manometer and its checking is effected under actual operating conditions and under the steam pressure of the boiler.

To blow off the dirt traps 66 the shut-offs 76 are closed and a suitable amount of water drawn from the traps by means of the valves 70. After a time allowed for reestablishment of the datum level in the cup 20 and condensation of steam therein and for the connecting tubes to reach normal temperature the shut-off valves 76 may be again opened and the manometer returned to service.

I herein also show an alternative means whereby the manometer may be filled and checked and consisting of standpipes 100 and 102 rising from the fittings 60 and in communication with the legs of the gage above the shut-off valves 76. One of these stand-pipes, herein that on the H. P. side, the right-hand side viewing Fig. 1, extends to a level above the top of the window of the gage G corresponding to an equalizing level in the gage, herein corresponding to the datum level E in the cup 20, slightly above the normal high water level. The other stand-pipe 102 as a whole extends to the same level but consists of two parts joined by the coupling 104 so that when the upper portion is removed a shorter stand-pipe is provided, the upper end of which corresponds to the checking level C in the gage. The word "corresponds" is here used advisedly since, as seen in the drawings, the lower section of the stand-pipe actually extends upwardly beyond the level C for reasons which will appear. Referring to Fig. 13, the caps 103 and 105 for the stand-pipes are again such as to provide for retaining the stand-pipe completely full and closing it without placing compression on the column of water therein, the cap having a sealing washer 106 at the base of the threaded opening therein and adjacent the washer a channel 108 in which surplus water may be discharged over the end of the pipe to find its way to the openings 110. The connection 104 between the upper and lower sections of the pipe 102 may be similarly formed, as indicated in Fig. 13.

Now, assuming the manometer to be closed off from the boiler at the cocks 76 and to be empty, the caps from the stand-pipes 100 and 102 are removed and water admitted, as by flowing it into open ends of the stand-pipes until they overflow. Afterwards the L. P. and H. P. arms of the gage will be filled with water to an equalized level. If the caps were replaced and manometric fluid supplied through the plug 64 until it overflowed at that point, the manometer would theoretically be in equalized condition. Since, however, in the construction described the indication is not visible, the construction herein illustrated permits filling and checking at a visible point, herein the point indicated at C. In this case after filling the stand-pipes as described, one of the caps is cracked open to permit the escape of water and give space for excess liquid and then replaced, excess liquid is added and the plug 64 replaced. The left-hand stand-pipe is then opened at the union 104 and excess fluid bled out at the bleeder valve 99. Both stand-pipes are filled exactly full and we then have impressed upon the H. P. side of the mechanism, the right-hand side viewing Fig. 1, a fixed liquid head corresponding to the upper end of the stand-pipe 100 and on the other side a fixed head corresponding to the upper end of the lower section of stand-pipe 102, and the level of the manometric fluid is adjusted to the mark C on the gage. The reason why the upper end of the lower section of the left-hand stand-pipe is actually above the mark C is that the mark C indicates a head of water at the specific gravity of the water in the boiler. The stand-pipes, however, are filled with cold water, or water at room temperature, which is heavier. Consequently the differential head produced by the difference between the columns in the two stand-pipes is greater per given lineal unit and the linear distance between these two ends to produce an indication at C should therefore be less and the end of the lower section at 104 correspondingly higher than the level of C.

The instrument may also be checked by means of these stand-pipes. The valves 76 being shut, if the cap is removed from the stand-pipe 100 and stand-pipe 102 is opened at the joint 104 by removal of the upper section, the gage should read at the checking point C if the pipes are filled full with water.

In the above description I have to a certain extent ignored the influence of the circumambient temperature at the manometer. Referring to Fig. 14, illustrating an inverted U-tube in condition of equilibrium, and assuming the fluid F in the two legs to stand at a level $o$ at a standard temperature, it will be clear that if the temperature rises the fluid will expand and its surfaces will be depressed, say to the level $o'$, and if the level $o$ were an indicated zero graduation correct for the standard temperature, the actual equalizing point would be lower than that indicated. This, which may be referred to as the "zero" effect, will depend upon the total volume of liquid F, its coefficient of expansion and the areas where it meets the water. It is equivalent to adding to the volume of liquid and is independent of the specific gravity of the liquid.

Now, referring to Fig. 15 showing an inverted U-tube under unbalanced conditions of pressure, as already explained, the head $h$ at the left is balanced by the algebraic sum of the volumes in the L. P. and H. P. legs in the zone $d$, which may be expressed by the equation $h = d(l-g)$. Now, considering the two columns in the zone between the lines $b$ and $c$, on change of temperature the liquids expand and the specific gravity or actual weight of these two columns is altered and in particular and in general the light fluid F will have a much greater coefficient of expansion than the water. The value indicated in the equation by the term $l$ is somewhat decreased (specific gravity of water decreases) while the value indicated by the term $g$ is decreased in much greater proportion, and the expression in the parenthesis increases in value and, for a given pressure $h$, $d$ is decreased and the level of liquid in the left-hand L. P. leg will shift upwardly. This calorimetric effect may be referred to as the "calibration" effect and it will be noted that in the case of an inverted U-tube the volumetric or "zero" effect causes a shift downwardly of the surface in the L. P. leg and calorimetric or "calibration" effect causes a shift upwardly on a rise in temperature. In utilizing an inverted U-tube we gain the important advantage that these effects of change of temperature are opposite in sign, and without reproducing the analysis it may be said that at some time they will have equal values and offset one another.

It will be clear that it will be desirable to fill and to check our manometer at the point or near the point where these effects compensate one for another as the filling and checking would then be independent of room temperature. In an instrument suitably designed in accordance with the principles herein described it will be found that this point is between the low water mark and the normal water mark, a highly desirable location within the most used portion of the range, and the checking point C may be selected at that point or conveniently near it so as to be some even inch indication removed from L and N facilitating the installation of the rest of the apparatus, the slight removal from the exact compensating point being acceptable provided the zero shift and the calibration shift effectively cancel one another. Compensation is thus provided for, as is possible in the case of the inverted U-tube, at an intermediate point in the range corresponding in general to the most used portion of that range, and the errors due to the changing values of the two effects mentioned will be less objectionable if they occur in the less used and less important parts of this range.

The fluid F conveniently may be a light hydrocarbon of the high octane gasoline class, dyed as above suggested with a dark dye. Such material is widely available where aviation fuel is obtainable and at present goes by the name "aviation alkylate." In particular in the case of a fleet of war vessels the material is available on those vessels which carry planes. The approximate specific gravity at 60° F., referred to water at 60° F., is .70, and while the aviation fuel is not manufactured as such to this exact specific gravity, commercially it is close thereto and by selecting a particular lot or by mixing particular lots a sufficient supply can be readily obtained at that exact specific gravity for which, it will be understood, the dimensions of the apparatus would be designed. The liquid is non-corrosive to metals and not injurious to the skin or offensive in odor. When used in an inverted U-tube gage as herein shown, it will be clear that dirt will not collect in the fluid. It is, of course, necessary to avoid air bubbles and to provide for filling the inverted U completely, but this is taken care of by the construction described in connection with the preferred methods of filling, utilizing over-filling and bleeding through the filling plug 64.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In a liquid level indicating device for boilers, a datum cup arranged to receive condensate from the boiler, a fitting below the same, a steam jacket between the cup and fitting, an overflow tube extending from the fitting through the jacket and projecting into the cup to a level at least as high as normal high water, a tube extending through the jacket and opening into the cup at a lower level, means for placing said overflow tube in communication with the water-containing space of the boiler, means to supply steam to the jacket and exhaust its condensate therefrom, a differential manometer at a remote location and connecting tubing connecting said tubes to the sides of the manometer.

2. In a liquid level indicating device for boilers, a datum cup arranged to receive condensate from the boiler, a fitting below the same, a steam jacket between the cup and fitting, an overflow tube extending from the fitting through the jacket and projecting into the cup to a level at least as high as normal high water, a tube extending through the jacket and opening into the cup at a lower level, means for placing said overflow tube in communication with the water-containing space of the boiler, means to supply steam to the jacket and exhaust its condensate therefrom, a differential manometer at a remote location and connecting tubing connecting said tubes to the sides of the manometer, the connecting tubing from the overflow tube opening to the latter at a level adjacent the normal low water level of the boiler.

3. In a liquid level indicating device for boilers, a datum cup arranged to receive condensate from the boiler, a fitting below the same, a steam jacket between the cup and fitting, an overflow tube extending from the fitting through the jacket and projecting into the cup to a level at least as high as normal high water, a tube extending through the jacket and opening into the cup at a lower level, said tubes within the jacket being crumped, means for placing said overflow tube in communication with the water-containing space of the boiler, means to supply steam to the jacket and exhaust its condensate therefrom, a differential manometer at a remote location and connecting tubing connecting said tubes to the sides of the manometer.

4. In a liquid level indicating device for boilers a datum cup arranged to receive condensate from the boiler, a fitting below the same, a steam jacket between the cup and fitting, an overflow tube extending from the fitting through the jacket and projecting into the cup to a level at least as high as normal high water, a tube extending through the jacket and opening into the cup at a lower level, a valved connection for placing said overflow tube in communication with the water-containing space of the boiler, a stand-pipe adjacent the tube having a valved connection thereto and extending to a level between normal high and low water, means for supplying steam to the jacket and exhausting it therefrom, a differential manometer at a remote location and connecting tubing connecting said tubes to the sides of the manometer.

5. In a liquid level indicating device for boilers, a datum cup arranged to receive condensate from the boiler and means to establish a fixed liquid head therein, a remote differential manometer, piping for connecting the sides thereof to said datum cup and the water-containing space of the boiler respectively, a stand-pipe to establish a liquid head less than said fixed head, and means for filling the same from the boiler, means for subjecting the liquid column in the pipe to boiler steam pressure, means for shutting off communication between the water-containing space of the boiler and its side of the manometer, and means for placing the stand-pipe in communication with that side.

6. In a device for indicating the liquid level in a container, a datum cup arranged to be replenished with liquid from the container, an overflow tube having its upper end projecting upwardly into the cup and having its upper edge notched substantially in a single plane, means for placing said overflow tube in communication with the liquid-containing space of the container, a differential manometer at a remote location, and connecting tubing connecting respectively a nether portion of the overflow tube and the datum cup to the sides of the manometer.

7. A liquid level indicating device for boilers, a datum chamber having a condensate compartment connected to the steam space of the boiler and having an overflow at a predetermined level and a compartment in communication with the water-containing space of the boiler, a differential manometer at a remote point, and tubes connecting said compartments to the manometer, which tubes adjacent said chamber have substantial horizontal reaches of substantial length to provide for bringing the liquids therein to room temperature without substantial variation of head.

8. A liquid level indicating device for boilers, a datum chamber having a condensate compartment connected to the steam space of the boiler and having an overflow at a predetermined level and a compartment in communication with the water-containing space of the boiler, a differential manometer at a remote point, and tubes connecting said compartments to the manometer, which tubes adjacent said chamber have substantial horizontal reaches of substantial length to provide for bringing the liquids therein to room temperature without substantial variation of head, said reaches being joined side by side to promote temperature equalization between them.

9. In a liquid level device for boilers, chambers exterior to the boiler adapted to be connected to a remote differential manometer and receiving respectively a fixed column of water replenished by condensate and a variable column in communication with the water-containing space of the boiler, a steam jacket about said chambers, means for supplying steam from the boiler to the jacket, and a drain pipe therefrom exposed to the atmosphere and extending to a low point of the boiler, whereby to permit the establishment therein of a relatively cool and heavy liquid column of an altitude lower than the low water level of the boiler.

10. In a liquid level indicating device for pressure containers, a differential manometer of the U-tube type, one leg of which includes a transparent portion whereby the momentary level in one leg of the manometer may be observed throughout a useful range, and means whereby different fixed heads of liquid under the pressure in the container may be applied to the legs of the manometer for checking such level, the differential of such fixed heads corresponding to a point within the range.

11. In a liquid level indicating device for pressure containers, a differential manometer of the U-tube type, one leg of which includes a transparent portion whereby the momentary level in one leg of the manometer may be observed throughout a useful range, a datum cup having means for establishing and maintaining therein a fixed high liquid head, the column in the cup being subject to the pressure of the container, means connecting said cup to one leg of the manometer, valved means for connecting the liquid-containing space of the container to the other leg, and means for applying to said other leg, the valved means being closed, a fixed liquid head less than said high head and subject to the pressure of the container for checking the level at a point within the range.

12. In a liquid level indicating device for pressure containers, a differential manometer of the U-tube type, one leg of which includes a transparent portion whereby the momentary level in one leg of the manometer may be observed throughout a useful range, a datum cup having means for establishing and maintaining therein a fixed high liquid head, the column in the cup being subject to the pressure of the container, the transparent portion being of such normal exposed height that the indicating level passes from view as pressures approach equalization near said fixed head, means connecting said cup to one leg of the manometer, valved means for connecting the liquid-containing space of the container to the other leg, and means for applying to said other leg, the valved means being closed, a fixed liquid head less than said high head and subject to the pressure of the container for checking the level at a point within the range.

13. In a liquid level indicating device for pressure containers, a differential manometer of the U-tube type, one leg of which includes a transparent portion whereby the momentary level in one leg of the manometer may be observed throughout a useful range, a datum cup having means for establishing and maintaining therein a fixed high liquid head, the column in the cup being subject to the pressure of the container, means connecting said cup to one leg of the manometer, valved means for connecting the liquid-containing space of the container to the other leg, and means for applying to said other leg, the valved means being closed, a fixed liquid head less than said high head and slightly greater than normal low level in the container and subject to the pressure of the container for checking the level at a point within the range.

14. In a liquid level indicating device for pressure containers, a differential manometer of the U-tube type, one leg of which includes a transparent portion whereby the momentary level in one leg of the manometer may be observed throughout a useful range, and means whereby different fixed heads of liquid each under equal superatmospheric gas or vapor pressures comparable to the pressure of the container may be applied to the legs of the manometer for checking such level against a point within the range.

15. A differential manometer of the inverted U-tube type, having means at its upper portion for introducing manometric fluid thereto and bleeding it therefrom, one leg of the device including a transparent portion whereby the momentary level therein may be observed throughout a useful range, valved means for connecting the legs to the source of differential pressure, and means comprising stand-pipes for applying to said legs, said valved means being closed, equal liquid heads and different liquid heads, the latter corresponding to a delineated point in said range.

16. A differential manometer of the inverted U-tube type, having means at its upper portion for introducing manometric fluid thereto and bleeding it therefrom, one leg of the device including a transparent portion whereby the momentary level therein may be observed throughout a useful range, valved means for connecting the legs to the source of differential pressure, and means comprising stand-pipes for applying to said legs, said valved means being closed, equal liquid heads and different liquid heads, the latter corresponding to a delineated point in said range and the former to an equalization point beyond said range.

17. In a liquid level indicating device for pressure containers, a differential manometer of the inverted U-tube type utilizing as a manometric fluid a liquid substantially lighter than that in the container, the low pressure leg of the U including a transparent portion whereby the momentary levels corresponding to operating fluctuations of level in the container may be observed, and means whereby different fixed heads of liquid may be applied to the legs of the manometer to bring the level to a determined point in the field of sight intermediate points corresponding to normal and low liquid levels in the container.

18. In a liquid level indicating device for pressure containers, a differential manometer of the inverted U-tube type utilizing as a manometric fluid a liquid substantially lighter than that in the container, the low pressure leg of the U including a transparent portion whereby the momentary levels corresponding to operating fluctuations of level in the container may be observed, and means to apply different fixed heads of liquid to the legs of the manometer to bring the level to a determined point in the field of sight whereat the volumetric expansion effect (zero effect) and the gravimetric expansion effect (calibration effect) effectively neutralize one another.

19. In a liquid level indicating device for pressure containers, a differential manometer of the inverted U-tube type utilizing as a manometric fluid a liquid substantially lighter than that in the container, the low pressure leg of the U including a transparent portion whereby the momentary levels corresponding to operating fluctuations of level in the container may be observed under the pressure in the container, and means to apply different fixed head of liquid to the legs of the manometer to bring the level to a determined point in the field of sight whereat the volumetric expansion effect (zero effect) and the gravimetric expansion effect (calibration effect) effectively neutralize one another.

20. In a liquid level indicating device for pressure containers, a differential manometer having a scale wherealong its responses are manifested, a datum cup having means for establishing and maintaining therein a fixed high liquid head, the column in the cup being subject to the pressure of the container, means connecting the cup to one side of the manometer, valved means for connecting the liquid-containing space of the container to the other side of the manometer, and means for applying to said other side, the valved means being closed, a fixed liquid head less than said high head and subject to the pressure of the container for checking the response of the manometer at a determined point along the scale.

21. In a liquid level indicating device for pressure containers, a differential manometer having a scale wherealong its responses are manifested, means for connecting the sides of the manometer to the container to provide for the exertion of different pressures on the sides thereof, the gas or vapor pressure within the container being exerted on each side and the pressure on one side including as a variable component the hydrostatic head of the liquid in the container, and means at will to shut off the latter pressure and substitute therefor the pressure of a fixed head of liquid subject to the gas or vapor pressure in the container for checking the response of the manometer at a determined point along the scale.

22. In a liquid level indicating device, a differential manometer of the inverted U-tube type utilizing as a manometric fluid a dark colored liquid substantially lighter than that in the container and having a substantially colorless liquid underriding the same in the low pressure leg, the tube comprising as a means for making visible the level of contact between said liquids a gage proper, comprising a rigid bar having a groove in one face thereof presenting a reflecting surface, and a glass overlying the groove, the cross section of the groove as closed by the glass forming a portion of the bore of the U.

23. In a liquid level indicating device, a differential manometer of the inverted U-tube type utilizing as a manometric fluid a dark colored liquid substantially lighter than that in the container and having a substantially colorless liquid underriding the same in the low pressure leg, the tube comprising as a means for making visible the level of contact between said liquids a gage proper, comprising a rigid bar having a milled groove in one face thereof presenting a reflecting surface, a glass overlying the groove, water ways through the ends of the bar opening to the groove whereby the cross section of the groove as closed by the glass forms a portion of the bore of the U, the water way at the upper end of the bar being shaped and proportioned to provide a constant cross-sectional area to the extreme upper end of the groove.

24. In a liquid level indicating device, a differential manometer of the inverted U-tube type utilizing as a manometric fluid a dark colored liquid substantially lighter than that in the container and having a substantially colorless liquid underriding the same in the low pressure leg, the tube comprising as a means for making visible the level of contact between said liquids a gage proper, comprising a rigid bar having a milled groove in one face thereof presenting a reflecting surface, a glass overlying the groove, water ways through the ends of the bar opening to the groove whereby the cross section of the groove as closed by the glass forms a portion of the bore of the U, the bar being so located that the level of contact at the equalizing point of the manometer is remote from said groove and the water way at the upper end of the bar being shaped and proportioned to provide a constant cross-sectional area to the extreme upper end of the groove.

LEWIS B. WINTON.